United States Patent [19]
Maki et al.

[11] Patent Number: 5,896,239
[45] Date of Patent: Apr. 20, 1999

[54] MAGNETIC DISK WRITING METHOD AND A MAGNETIC DISK APPARATUS

[75] Inventors: Shinichi Maki; Tatsuya Masuda; Kazunobu Tomiyama; Yoshihisa Matsumoto, all of Kawasaki, Japan

[73] Assignee: Fujitsu Limited, Kawasaki, Japan

[21] Appl. No.: 08/125,311

[22] Filed: Sep. 21, 1993

[30] Foreign Application Priority Data

Dec. 18, 1992 [JP] Japan ................. 4-355588

[51] Int. Cl.⁶ .................................................. G11B 5/09
[52] U.S. Cl. ...................................... 360/46; 360/124
[58] Field of Search ........................... 360/46, 48, 53, 360/32, 49, 51, 40, 27, 61, 77.05, 77.04, 77.06

[56] References Cited

U.S. PATENT DOCUMENTS

| | | | |
|---|---|---|---|
| 4,525,753 | 6/1985 | Shimeki et al. | 360/45 |
| 4,967,292 | 10/1990 | Moteki | 360/61 X |
| 5,099,367 | 3/1992 | Sidman | 360/67 X |
| 5,136,439 | 8/1992 | Weispfenning et al. | 360/77.08 |
| 5,193,036 | 3/1993 | Green et al. | 360/77.05 X |
| 5,210,669 | 5/1993 | Weispfenning et al. | 360/124 |
| 5,260,703 | 11/1993 | Nguyen et al. | 341/100 |

FOREIGN PATENT DOCUMENTS

| | | | |
|---|---|---|---|
| 58-97164 | 6/1983 | Japan | 369/43 |
| 61-105783 | 5/1986 | Japan | 369/43 |
| 63-53710 | 3/1988 | Japan | 369/43 |
| 4103088 | 4/1992 | Japan | 369/43 |

*Primary Examiner*—Thien Minh Le
*Attorney, Agent, or Firm*—Greer, Burns & Crain, Ltd.

[57] ABSTRACT

A method and disk apparatus, for writing data disk apparatus, that reduces the adverse influence of noise caused by data head writing on a read signal of a servo head even though the data head and the servo head are collaterally paired with no disks there between. A magnetic disk apparatus comprises a plurality of magnetic disks that are stacked at predetermined intervals; a servo head for reading servo signals recorded on a servo surface of one of the magnetic disks; a plurality of data heads, one of which is provided for each data surface of the magnetic disks with a first data head being collaterally positioned with the servo head, with no intervening magnetic disk, and second data heads being positioned at other than the collateral position; and an actuator for supporting the servo head and the data heads and for positioning the servo head and the data heads by moving them radially relative to the magnetic disks. The method comprises the steps of: producing a write current whose value is varied by selecting either the first data head or one of the second data heads in consonance with a head select signal; and driving, at the write current value, the data head that is selected by the head select signal in consonance with write data. The magnetic disk apparatus further comprises a write circuit for varying a write current value by selecting either the first data head or one of the second data heads in consonance with a head select signal, and for driving the selected data head in consonance with write data.

11 Claims, 10 Drawing Sheets

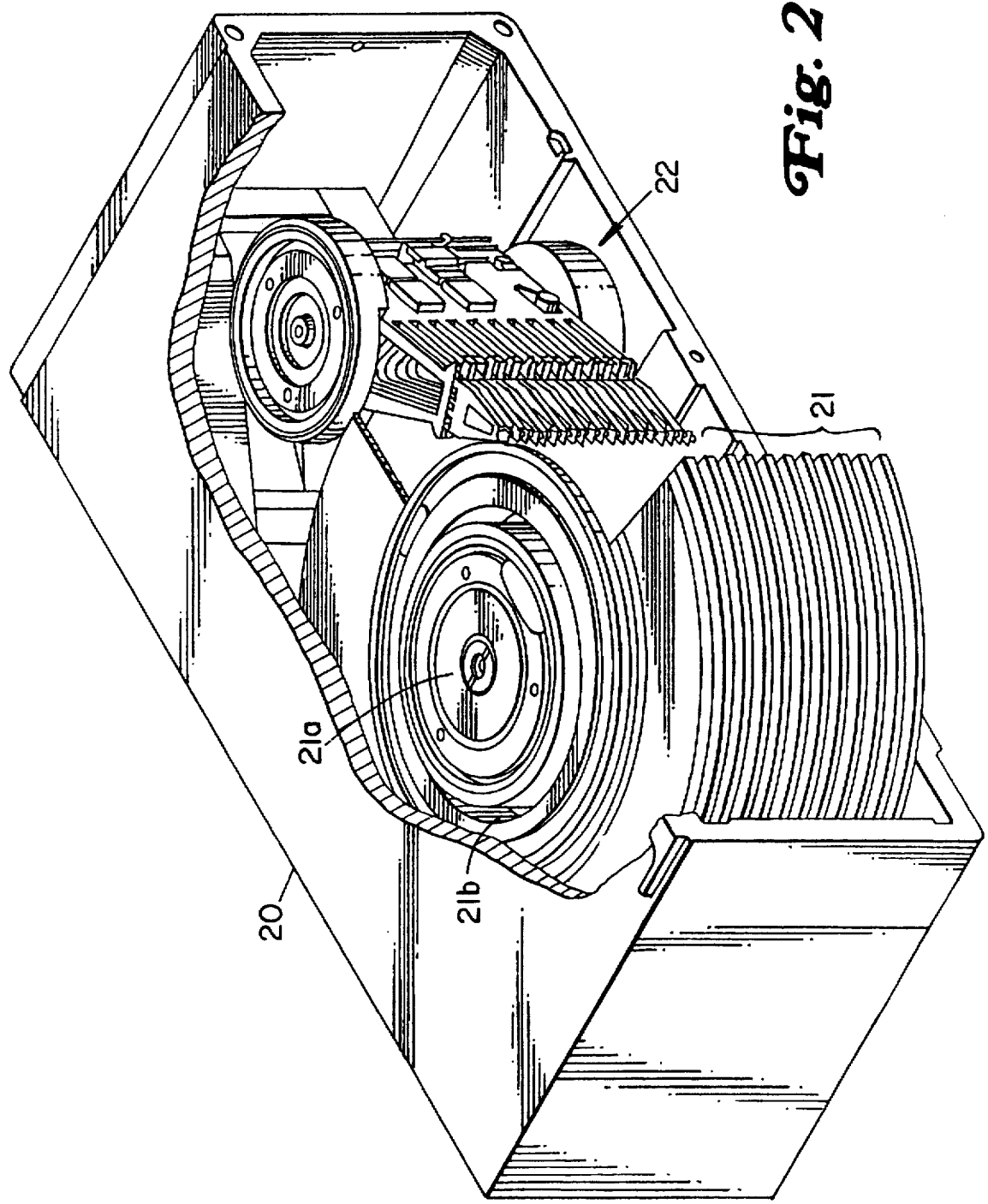

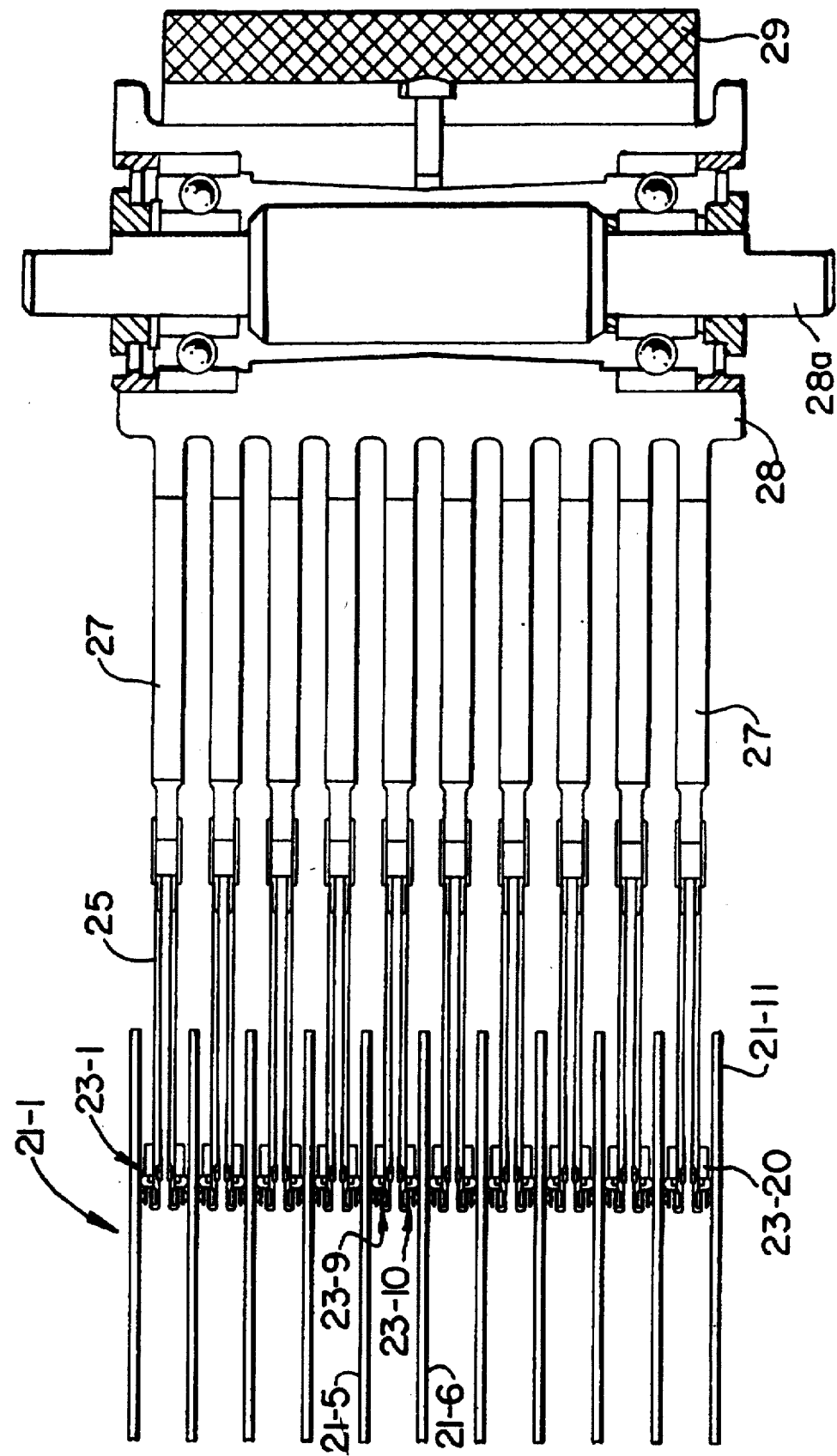

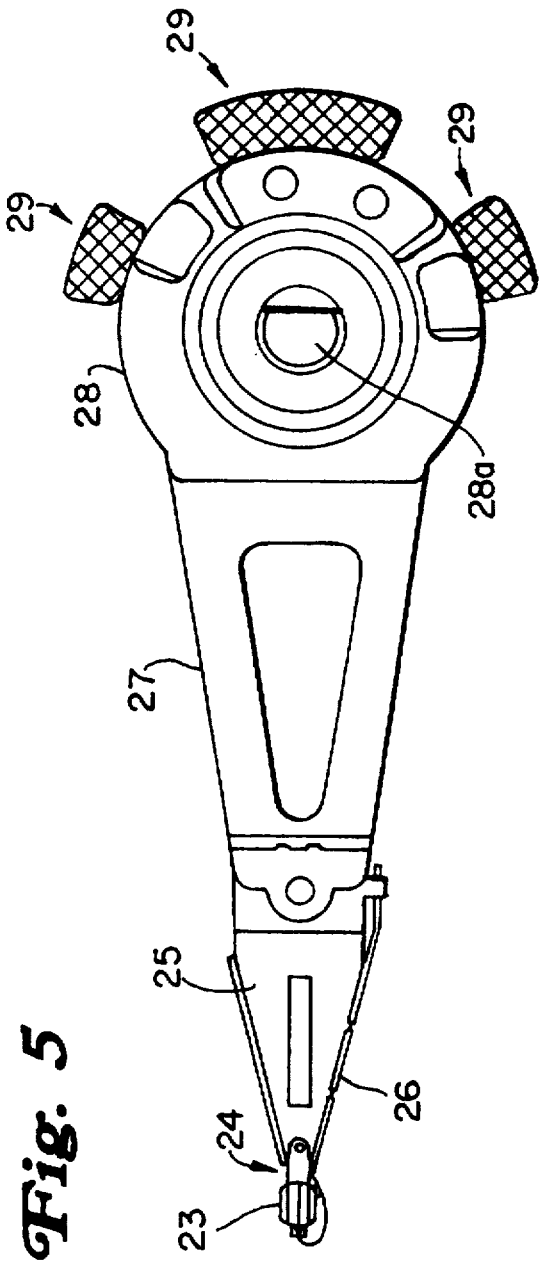
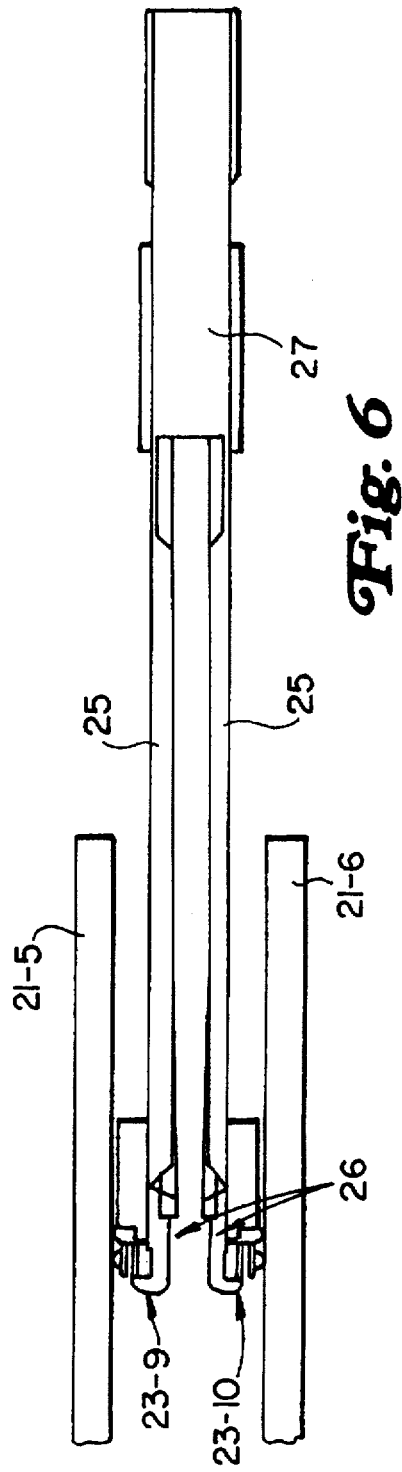

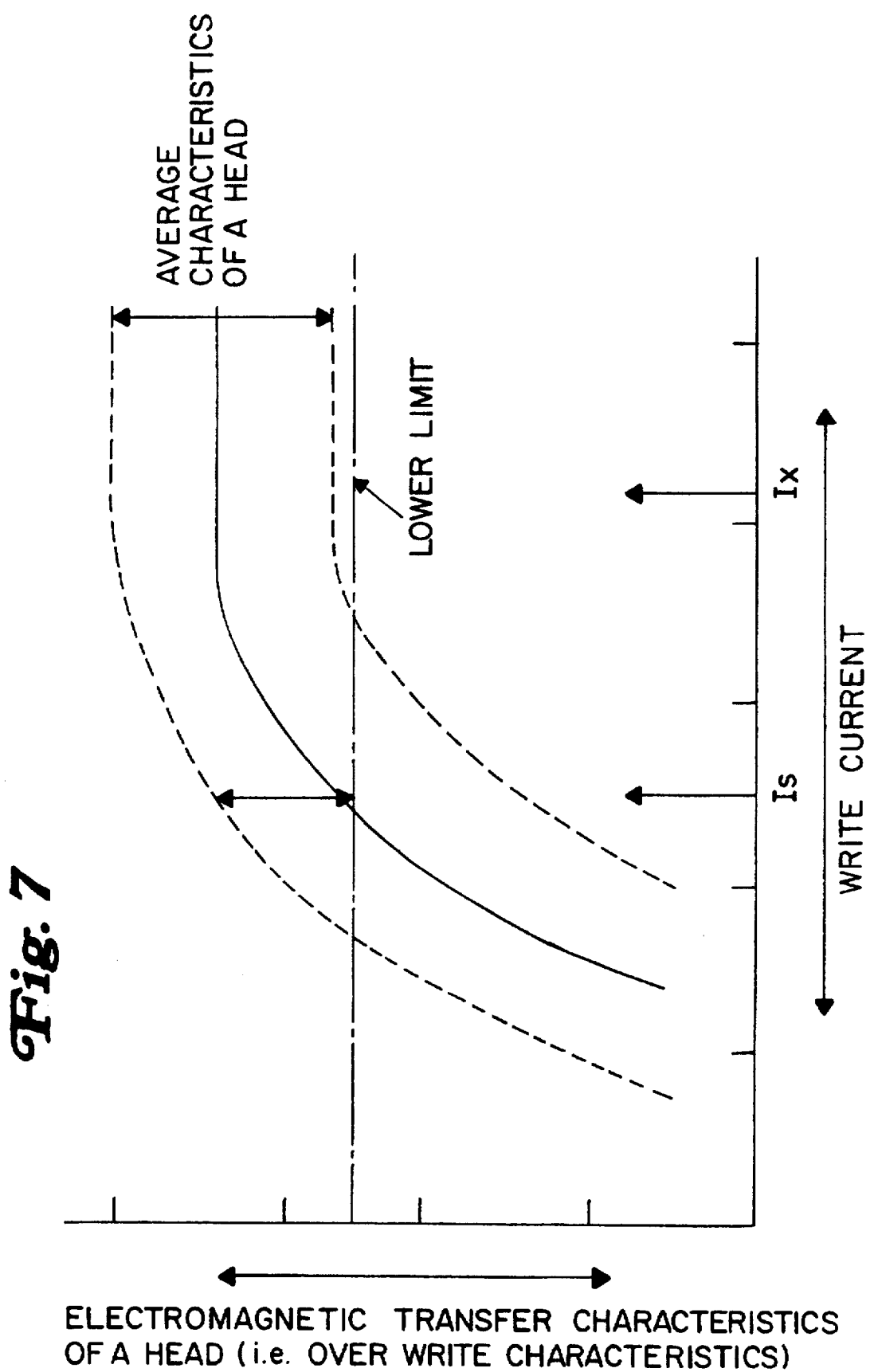

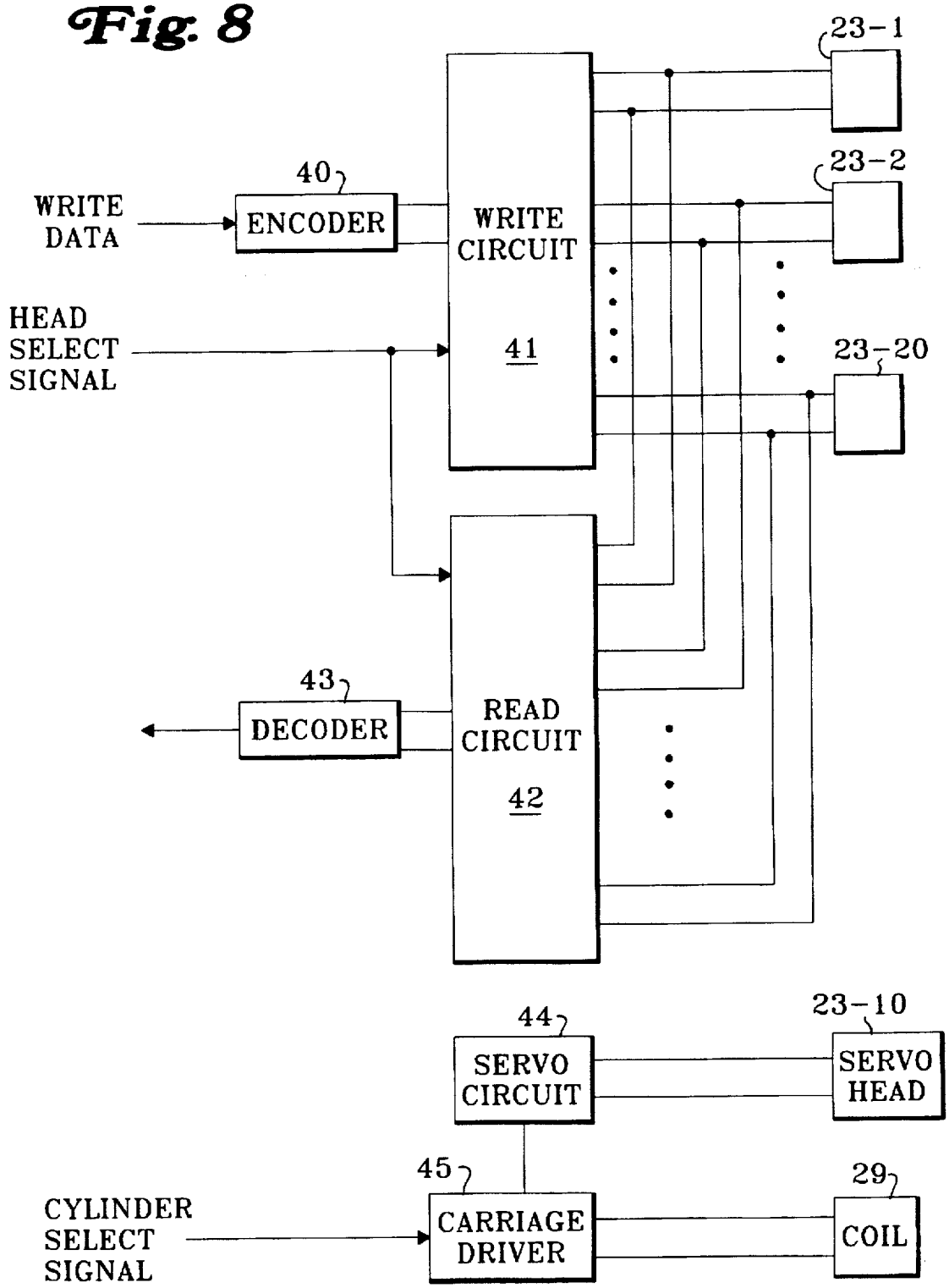

MAGNETIC DISK WRITING METHOD AND A MAGNETIC DISK APPARATUS

BACKGROUND OF THE INVENTION

1. Field of the Invention

The present invention relates to a method for writing data in a magnetic disk apparatus that employs a single surface of one disk of stacked magnetic disks as a dedicated servo surface, and a magnetic disk apparatus. In particular, the present invention pertains to a method for writing data in a magnetic disk apparatus that prevents the noise that occurs during data head writing from adversely affecting a servo head read signal, and a magnetic disk apparatus that employs that method.

2. Description of the Related Art

A magnetic disk apparatus, a kind of data storage device, includes rotary magnetic disks, magnetic heads, and an actuator to position the magnetic heads over desired tracks on the magnetic disks. In this magnetic disk apparatus, after the actuator position the magnetic head over a desired track on the magnetic disk, the magnetic head read data from or write data to the track. Such magnetic disk apparatuses are widely used as external data storage devices. Because of the recent emphasis on reducing the size of computer systems, compact magnetic disk apparatuses that have large memory capacities are in demand. To further expand the memory capacity of magnetic disk apparatuses, in addition to increasing the disk data recording density, it is also necessary to increase the number of disks that can be mounted in an apparatus without exceeding a predetermined height.

FIGS. 1A and 1B are explanatory diagrams for prior art.

As shown in FIG. 1A, a magnetic disk apparatus includes a plurality of rotary magnetic disks 10-1 to 10-n and an actuator (or a carriage) 12 that carries a plurality of magnetic heads 11-1 to 11-p at its extremity. When seeking a desired track, the actuator 12 moves the magnetic heads 11-1 to 11-p radially across the tracks on the magnetic disks 10-1 to 10-n. After the magnetic heads 11-1 to 11-p are positioned over the desired track, it performs either data reading from or data writing to that track.

To position the magnetic heads 11-1 to 11-p over a desired track, it is necessary to control the position of the actuator 12. For this purpose, a servo signal pattern, which has been recorded on one surface (servo surface) of a magnetic disk, is read by a servo head and the actuator 12 is controlled in consonance with the read servo signal.

Generally, a dedicated servo surface is provided either on the top magnetic disk of the stacked magnetic disks 10-1 to 10-n (magnetic disk 10-1 in the diagram), or on the bottom magnetic disk (magnetic disk 10-n in the diagram). When the thermal deformation of arms 13, of the actuator 12, to which are fixed magnetic heads 11-1 to 11-p, occurs, however, positioning differences between the servo head 11-1, which faces the servo surfaces and the data head 11-p, which is the farthest from the servo head 11-1, commonly occur. More specifically, the greater the distance between the arms 13, the greater is the temperature variation between the arms 13. Also, because the actuator 12 is not uniformly constructed, the thermal deformation of the arms 13 varies widely. Thus, there is an increased difference in the relative positions of the servo head 11-11 to the data head 11-p that is located farthest therefrom.

When the above described thermal deformation occurs at the actuator 12, the positioning difference (i.e., off track measurement) of the data head, located farthest from the servo head, increases with respect to the data track to which data was written by that data head before deformation, and read errors easily occur. Likewise, a data track where data was newly written after deformation has occurred tends to have a large off track measurement when the arm 13 assumes its original shape, and the above described conditions will also occur.

To prevent such an occurrence, one method reduces an off track measurement by providing a servo surface on a magnetic disk 10-m that is located almost in the middle of the stacked magnetic disks 10-1 to 10-n, and by shortening the distance between the top head and the bottom head, both of which are positioned the farthest from the servo surface.

In this method, as shown in FIG. 1B, a servo head 11-m, for the servo surface, which is positioned over the top surface of the magnetic disk 10-m, is collaterally paired with a data head 11-l, which is positioned over the bottom surface of the adjacent magnetic disk 10-l, with no intervening magnetic disk.

In this case, when the inter-disk spacing for the magnetic disks is reduced so that more magnetic disks can be stacked, because of the recently arising request for increased memory capacity, the space between the servo head 11-m and the data head 11-l is accordingly reduced. When data is written by the data head 11-l, therefore, electromagnetic induction caused by the write current that is supplied to the data head 11-l increases, and magnetic flux leakage from the data head 11-l greatly interferes with read signals from the servo head 11-m. Consequently, since electromagnetic noise leakage due to data writing by the data head 11-l is easily carried by the read output from the servo head 11-m, the quality of a servo signal is deteriorated and servo positioning errors easily occur.

For a magnetic disk apparatus within which the inter-disk spacing for the stacked magnetic disks is restricted, therefore, reduction of the electromagnetic noise is required in order to collaterally locate the data head 11-l with the servo head 11-m. Conventionally, the following proposals have been made:

(1) A shield plate is provided between the servo head 11-m and the collaterally positioned data head 11-l to prevent electromagnetic noise leakage (for example, Japanese Unexamined Patent Publication Nos. Sho 61-105783, and Hei 4-103088).

(2) To reduce the effect on the servo head 11-m of the noise produced by its collaterally positioned data head 11-1, the relative positions of the two heads are altered by shifting them radially or circumferentially with respect to magnetic disks (for example, Japanese Unexamined Patent Publication No. Sho 63-53710).

(3) In order to reduce noise, the points at which a write current that flows to the data head 11-1 rises and falls are shifted with respect to the peak of the output of a read signal from the servo head 11-m (for example, Japanese Unexamined Patent Publication No. Sho 58-97164).

As for the first proposal, however, shield plate components are necessary. Also, a shield plate attached to a servo head, or its collaterally positioned data head, alters the floating characteristics of the head to which it is attached compared to a head without an attached shield plate, and this causes excessive abrasion of a head and a magnetic disk. Further, because of the configuration of the apparatus, it is difficult to place the shield plate between a magnetic disk with a servo surface and a facing magnetic disk by adding it to the magnetic disk stack.

Regarding the second proposal, a gimbal to hold a magnetic head at the arm of a carriage cannot commonly be used for all the heads, and as the positions of these heads are shifted, the heads move off the tracks radially or circumferentially and narrow the movable range of a carriage.

Further, as for the third proposal, since the frequency of a write current is high even though the points at which a current rises and falls are shifted between the peaks of signals, noise leakage cannot be reduced. Therefore, it is not possible to prevent noise from being carried by a servo signal.

SUMMARY OF THE INVENTION

It is therefore an object of the present invention to provide a method for writing data in a magnetic disk apparatus that can reduce the adverse influence of electromagnetic noise on a servo head, which occurs while data is being written by a data head that is collaterally paired with the servo head, and a magnetic disk apparatus that employs this method.

It is another object of the present invention to provide a method for writing data in a magnetic disk apparatus that can reduce the adverse influence of electromagnetic noise on a servo head, which occurs while data is being written by a data head that is collaterally paired with the servo head, even when the distance between the servo head and the data head is reduced, and a magnetic disk apparatus that employs this method.

It is still another object of the present invention to provide a method for writing data in a magnetic disk apparatus that can easily reduce the adverse influence of electromagnetic noise on a servo head, which occurs while data is being written by a data head that is collaterally paired with the servo head, and a magnetic disk apparatus that employs this method.

To achieve these objects, according to one aspect of the present invention, a magnetic disk apparatus includes a plurality of magnetic disks that are stacked at predetermined intervals; a servo head for reading servo signals recorded on a servo surface of one of the magnetic disks; a plurality of data heads, one of which is provided for each data surface of the magnetic disks, with a first data head being collaterally positioned with the servo head with no intervening magnetic disk, and second data heads being positioned at other than the collateral position; and an actuator for supporting the servo head and the data heads and for positioning the servo head and the data heads by moving them radially relative to the magnetic disks. Method for writing data in a magnetic disk apparatus, comprises the steps of: producing a write current whose value is varied by selecting either the first data head or the second data heads in consonance with a head select signal and wherein the write current produced when signal first data head is selected is less than a value of a write current that is produced when one of said second data head is selected; and driving, at the write current value, the data head that is selected by the head select signal in consonance with write data According to another aspect of the present invention, a magnetic disk apparatus comprises: a plurality of magnetic disks that are stacked at predetermined intervals; a servo head for reading servo signals recorded on a servo surface of one of the magnetic disks; a plurality of data heads, one of which is provided for each data recording surface of the magnetic disks, with a first data head being collaterally positioned with the servo head with no intervening magnetic disk, and second data heads being positioned at other than the collateral position; an actuator for supporting the servo head and the data heads and for positioning the servo head and the data heads by moving them radially relative to the magnetic disks; and a write circuit for varying a write current value by selecting either the first data head or one of the second data heads in consonance with a head select signal, and for driving the selected data head in consonance with write data and for setting the write current produced when said first data head is selected smaller than a value of a write current that is produced when one of said second data heads is selected.

According to the present invention, since the strength of electromagnetic noise is proportional to the value of a write current, the write current value for a data head that is collaterally positioned with a servo head is smaller than the write current values for other data heads. The strength of electromagnetic noise that occurs while data is being written by the data head that is collaterally positioned with the servo head can be reduced, and the adverse influence of such noise on a servo signal from the servo head can also be decreased.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principle of the invention.

FIG. 2 is a perspective view illustrating a magnetic disk apparatus according to one embodiment of the present invention;

FIG. 4 is a cross sectional view of a head actuator of the magnetic disk apparatus depicted in FIG. 2;

FIG. 5 is a top view of the head actuator in FIG. 4;

FIG. 6 is a partially enlarged diagram showing the head actuator in FIG. 2;

FIG. 7 is a characteristic graph for a magnetic head that is employed in the embodiment of the present invention;

FIG. 8 is a control block diagram of the magnetic disk apparatus;

DETAILED DESCRIPTION OF THE PREFERRED EMBODIMENT

Figure 1A:
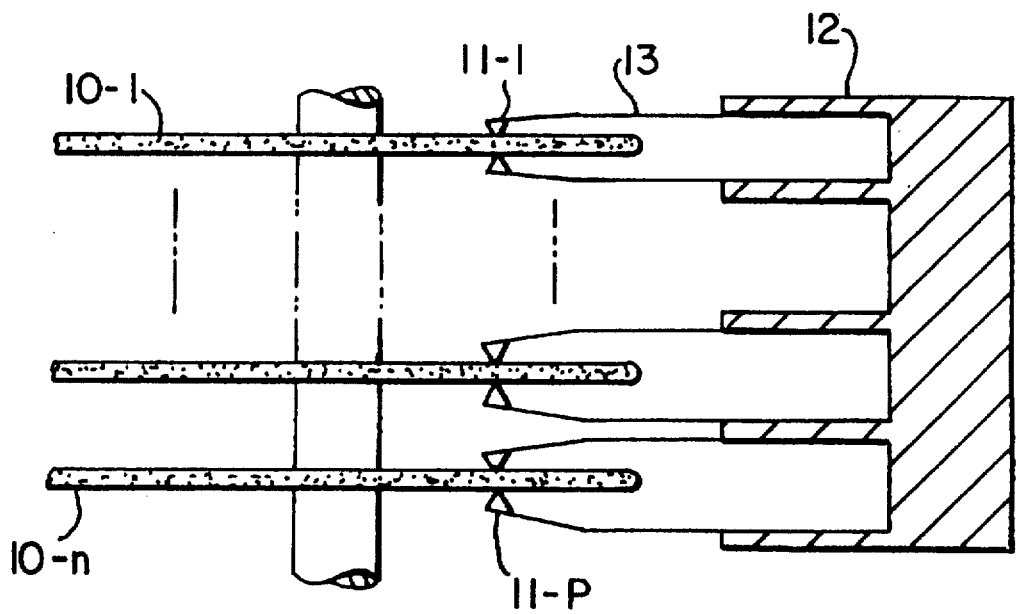
FIGS. 1A and 1B are explanatory diagrams for prior art.
Figure 1B:
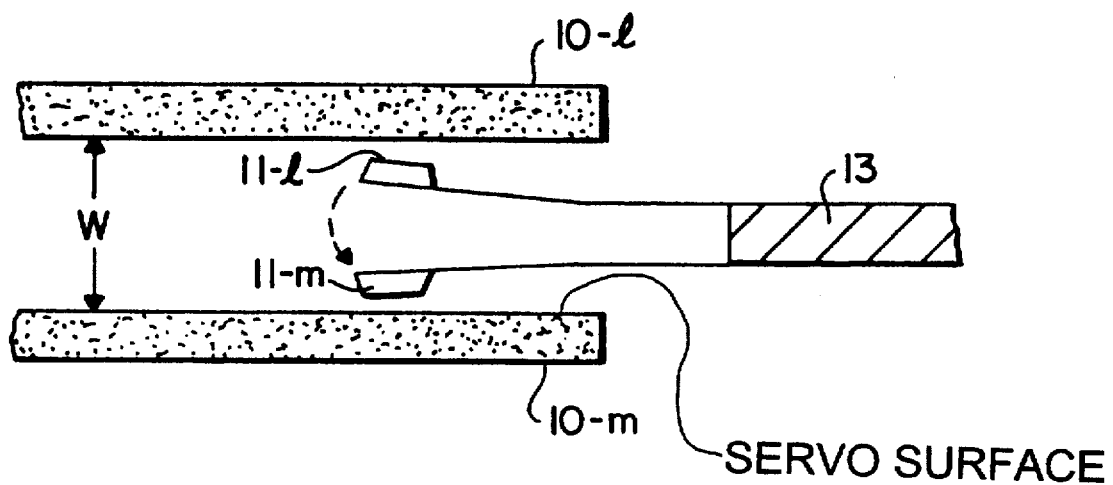
Figure 3:
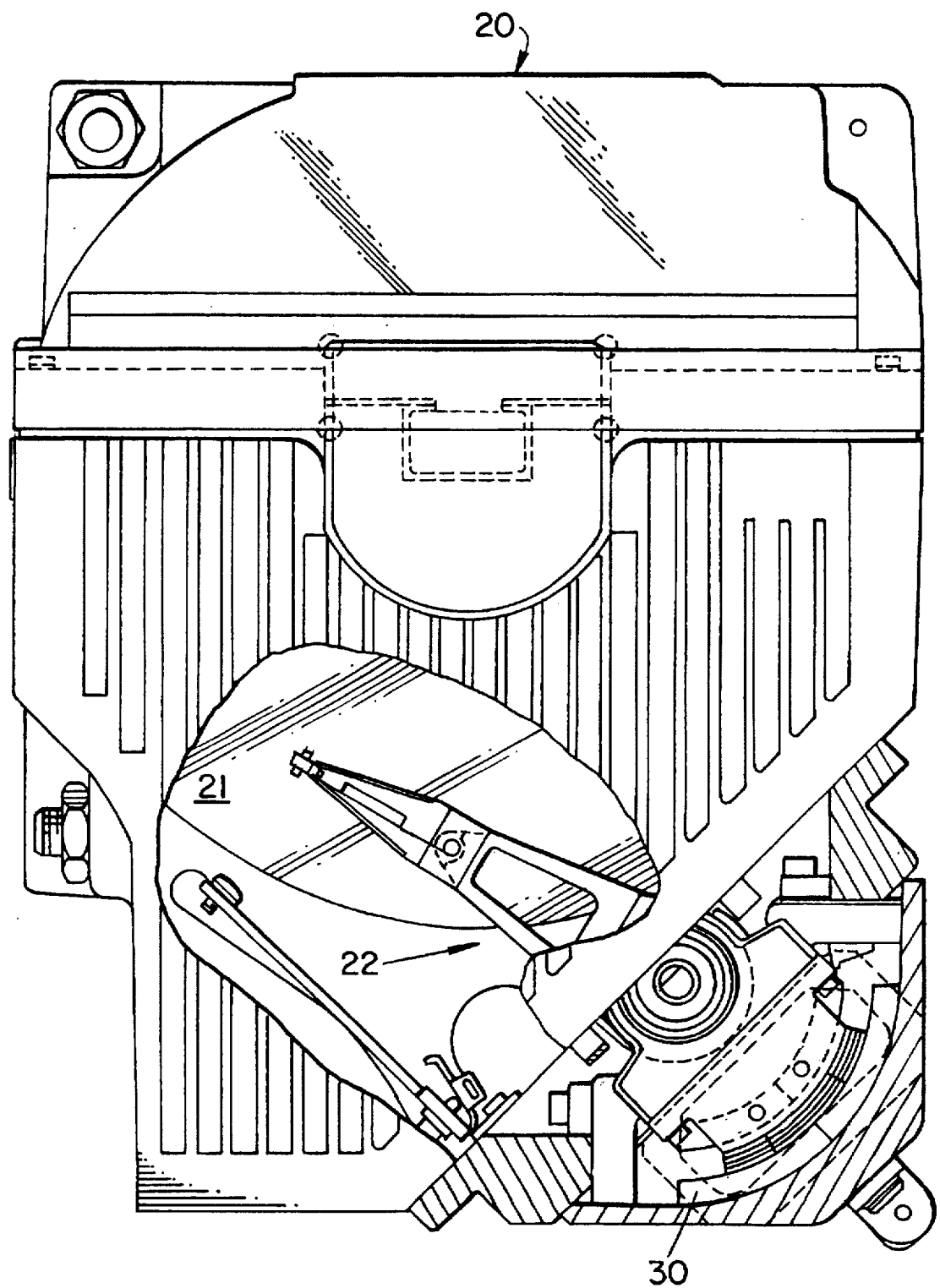
FIG. 3 is a top view illustrating the magnetic disk apparatus shown in FIG. 2.

FIG. 2 is a perspective diagram showing a magnetic disk apparatus according to one embodiment of the present invention; FIG. 3 is a top view of the magnetic disk apparatus in FIG. 2; FIG. 4 is a cross section of a head actuator of the magnetic disk apparatus in FIG. 2; FIG. 5 is a top view showing the head actuator in FIG. 4; FIG. 6 is a partially enlarged diagram of the head actuator in FIG. 2; and FIG. 7 is a characteristic graph for a magnetic head that is employed in the embodiment of the present invention. It should be noted that FIG. 2 shows the interior of the magnetic disk apparatus with its case removed along the cutaway line.

In the arrangement of the magnetic disk apparatus shown in FIGS. 2 and 3, a case 20 of the magnetic disk apparatus, which is made of metal, such as aluminum, provides support for a rotary shaft for magnetic disks 21, which will be described later, and for a rotary shaft for a head actuator 22. The magnetic disks 21, which are 5.25 inches in diameter, are fixed to a motor hub 21b that is rotatably supported by a bearing 21c around a rotary shaft 21a that constitutes a spindle motor. When the spindle motor rotates the motor hub 21b by employing a coil (not shown) provided around the rotary shaft 21a, the magnetic disks 21 are rotated in unison with the motor hub 21b. As will be described later, the head actuator 22 that has magnetic heads, mounted at its extremity, that are displaced radially relative to the magnetic disks 21 as the head actuator 22 rotates on its rotary shaft.

A magnetic circuit 30 is provided opposite to a drive coil 29 (see FIG. 4) of the head actuator 22. Accordingly, when the coil 29 is driven, the head actuator 22 rotates on a shaft 28a (see FIG. 4). On an IC mounting board 31, which is located along the side of the head actuator 22, are mounted IC circuits such as a write circuit and a read circuit.

As shown in FIGS. 2 and 4, eleven evenly spaced magnetic disks 21-1 to 21-11 are stacked in the magnetic disk apparatus. More specifically, rather than just the conventional eight magnetic disks, three additional magnetic disks 21 are provided in an apparatus having a predetermined height (form factor). Accordingly, the inter-disk spacing for the magnetic disks 21-1 to 21-11 is smaller.

In the arrangement for the head actuator 22 depicted in FIGS. 4 and 5, bearings 28b rotatably support a block 28 on the fixed shaft (rotary shaft) 28a that is fixed at its ends by the case 20. The drive coil 29, which is provided at the rear of the block 28, together with the magnetic circuit 30 constitutes a motor, and rotates the block 28 on the fixed shaft 28a. Arms 27 are provided entirely and protrude from the block 28; ten arms are provided for the block 28.

Spring arms 25, leaf springs made of, for example, stainless steel, are fixed to the upper and lower sides of the arms 27, and support the magnetic heads 23. Gimbals 24, which are provided at the extremities of the respective spring arms 25 and to which the magnetic heads 23 are attached, are employed to control the posture of the magnetic heads 23. The magnetic heads 23, consisting of sliders with thin film heads (inductive thin film heads) at their rear portion, are attached to the gimbals 24. Each lead line 26 is connected at one end to a thin film head of a magnetic head 23, and extends along one side of a spring arm 25 and an arm 27. The other end of the lead line 26 is connected to the IC mounting board 31 depicted in FIG. 2.

In this embodiment, the inter-disk spacing for eleven magnetic disks 21-1 to 21-11 that are stacked within the specified height of the apparatus is approximately 3 mm, which is smaller than a conventional 5 mm that is employed for a stack of eight magnetic disks. The servo surface on which the servo signal pattern is recorded is provided on the top of the magnetic disk 21-6 in the middle of the eleven magnetic disks 21-1 to 21-11. A servo head 23-10, the magnetic head that faces the servo surface, reads the servo signal patterns on the servo surface of the magnetic disk 21-6.

Since the distance from the servo surface to the magnetic disk 21-1 or 21-11, which are the farthest from the servo head, is shortened when the servo surface is provided on a magnetic disk in the center of the stacked magnetic disks 21-1 to 21-11, even if the block 28 and the arms 27 are deformed by, for example, heat and the shaft 28a of the block 28 is displaced, the offset value will be small.

Further, in this embodiment, as ten arms 27 and twenty magnetic heads 23 are prepared for eleven magnetic disks 21-1 to 21-11, the top surface of the magnetic disk 21-1 and the bottom surface of the magnetic disk 21-11 are not used. Two more arms 27 would be required if these surfaces were utilized; however, as the resultant structure would then exceed the specified height, the top surface of the magnetic disk 21-1 and the bottom surface of the magnetic disk 21-11 are not used. Were there no apparatus height restriction, more arms 27 could be provided to use these surfaces.

As shown in FIG. 6, the servo head 23-10 is provided over the servo surface, which is the top surface of the magnetic disk 21-6, and a data head 23-9 is provided over the bottom surface of the magnetic disk 21-5 that is positioned over the magnetic disk 21-6. The servo head 23-10 and the data head 23-9 are collaterally positioned with no intervening magnetic disk.

The heads 23-9 and 23-10 are attached to the gimbals 24 that are provided at the extremities of the spring arms 25.

The spring arms 25 are attached to the arms 27, and the lead lines 26, which are connected respectively to the heads 23-9 and 23-10, are extended along the spring arms 25.

The inter-disk spacing for the magnetic disks 21-5 and 21-6 is about 3 mm, as described above. The space between the servo head 23-10 and the data head 23-9 is approximately 1 mm, and noise leakage caused when data is written by the data head 23-9 therefore tends to affect the read signals from the servo head 23-10.

Since noise leakage is proportional to the value of a write current for the data head 23-9, this write current has a smaller value than write currents for the other data heads, 23-1 to 23-8, and 23-11 to 23-20. The influence of noise leakage is thus reduced.

While referring to FIG. 7, to select the data head 23-9 that is collaterally positioned with the servo head 23-10, the preferable procedure is as follows. In general, the electromagnetic transfer characteristics of a magnetic head are not constant, and are, to a degree, distributed. Normally, for quality control, the electromagnetic transfer characteristics of a magnetic head are examined during an inspection process. Of the electromagnetic transfer characteristics, the Over Write characteristic, for example, is well known.

To measure the Over Write characteristic, after a low frequency pattern has been written to a magnetic disk by a magnetic head at a certain write current value, the pattern is read by the magnetic head and the level (the first level) of that pattern is measured. Then, at the same write current value, a pattern having the maximum frequency that the apparatus can handle is written to the identical portion of the magnetic disk by the magnetic head. After the write data is read from the magnetic disk by the magnetic head, the components (residual components) of the previously described, low frequency pattern are extracted from that read signal, and the level (the second level) of the pattern is measured. The second level value is divided by the first level value to obtain a ratio.

In writing data to a magnetic disk, as long as a write current has an identical value, the magnetizing force of a magnetic disk is strong for a low frequency pattern and weak for a high frequency pattern. Therefore, when a high frequency pattern is written over a previously written low frequency pattern on a magnetic disk, the low frequency pattern is not completely erased, and components of the low frequency pattern remain, even though at a low level. The ratio of the pattern levels can be measured.

The residual level is proportional to a write current value that is supplied to a magnetic head. As the write current value increases, the magnetizing force of the magnetic disk when writing a low frequency pattern is saturated at a small write current value, and the magnetizing force of a magnetic disk when writing a high frequency pattern is saturated at a large write current value. As shown in FIG. 7, as the write current value increases, the ratio of the levels increases and magnetization is saturated.

Since a write current usually has a predetermined value, a magnetic head whose obtained ratio at the predetermined write current value does not reach the ratio that is specified for the apparatus is determined to be bad, and a magnetic head whose obtained ratio reaches the specified ratio is determined to be good.

In other words, the write current value that reaches the above described ratio for the lower characteristic limit varies in unison with the electromagnetic transfer characteristics of a magnetic head and a magnetic disk. More specifically, a magnetic head and a magnetic disk, both of which have good electromagnetic transfer characteristics, reach the ratio for the lower characteristic limit at a small write current value. A magnetic head and a magnetic disk that have bad electromagnetic transfer characteristics reach the ratio for lower characteristic limit at a large write current value.

For identical magnetic disks, the Over Write characteristic value, i.e., the above described ratio for magnetic heads, approaches the lower characteristic limit as a write current increases, and finally exceeds that limit and reaches a saturation point, as shown in FIG. 7. Write current values that reach a predetermined lower characteristic limit are distributed depending on the magnetic heads, and the electromagnetic transfer characteristics of the magnetic heads also vary. A magnetic head with a preferable electromagnetic transfer characteristic reaches the predetermined lower characteristic limit at a small write current value, while a magnetic head with an undesirable electromagnetic transfer characteristic reaches the predetermined lower characteristic limit at a large write current value.

When such a magnetic head that reaches the predetermined lower characteristic limit at a small write current is employed as the data head 23-9 that is collaterally positioned with the servo head 23-10, data writing to satisfy the Over Write characteristic is possible even at a reduced current value for the data head 23-9.

In this embodiment, a magnetic head that has a write current value Is (for example, 15 mA) that satisfies a predetermined lower characteristic limit shown in FIG. 7 is used as the data head 23-9. Magnetic heads that have write current values Ix (for example, 30 mA) to satisfy the predetermined lower characteristic limit are used for the other data heads, 23-1 to 23-8 and 23-11 to 23-20. The characteristics of these data heads are only just adequate to satisfy the predetermined lower characteristic limit at the write current value Ix or below.

Even when the value of a write current that flows to the data head 23-9 is small, therefore, the same Over Write characteristic as that of the data heads that receive strong write current can be acquired, and write errors can be prevented. An error rate may be established by determining the effectiveness of the Over Write characteristic, instead of employing the previously described level measurement.

Figure 9:
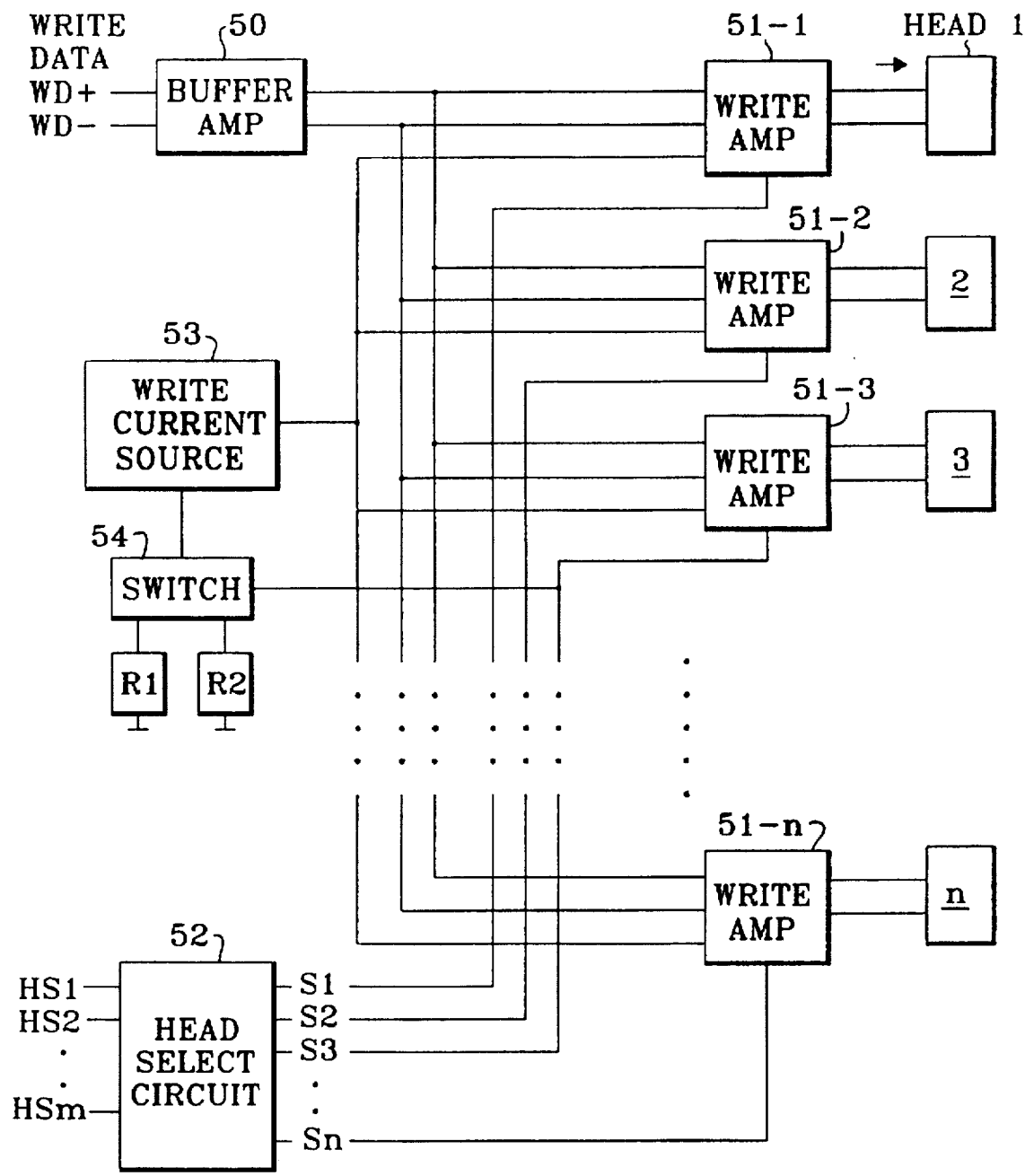
FIG. 9 is a block diagram showing a write circuit.
Figure 10:
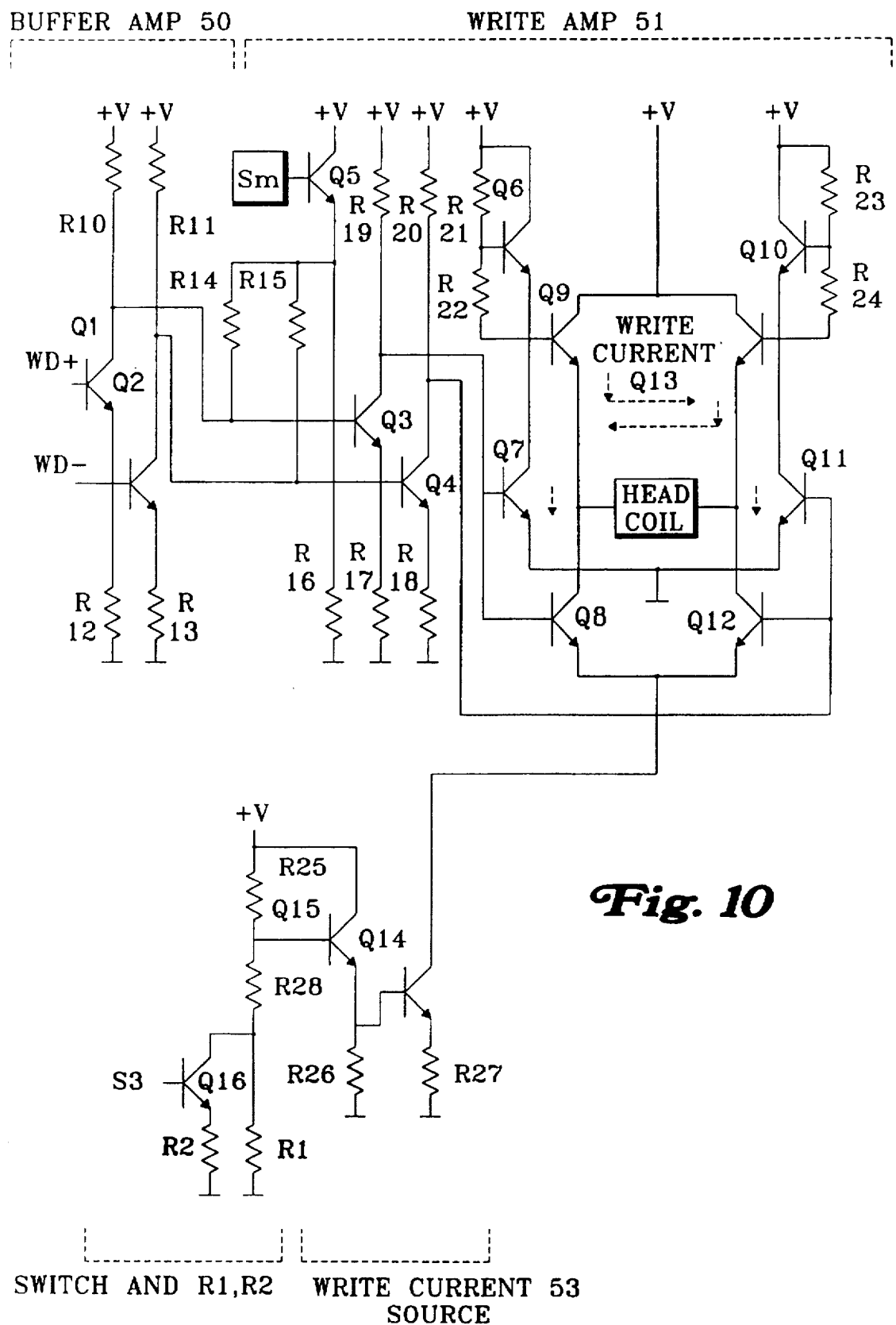
FIG. 10 is a circuit diagram of the write circuit shown in FIG. 9.
Figure 11A:
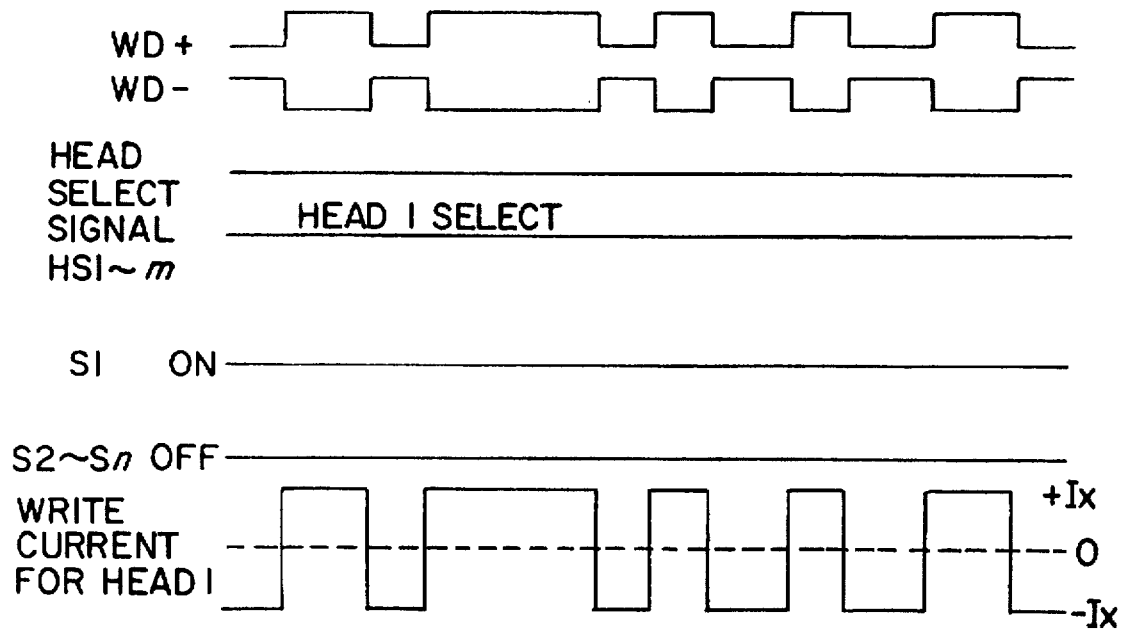
FIGS. 11A and 11B are diagrams for explaining data writing processing of the embodiment of the present invention.
Figure 11B:
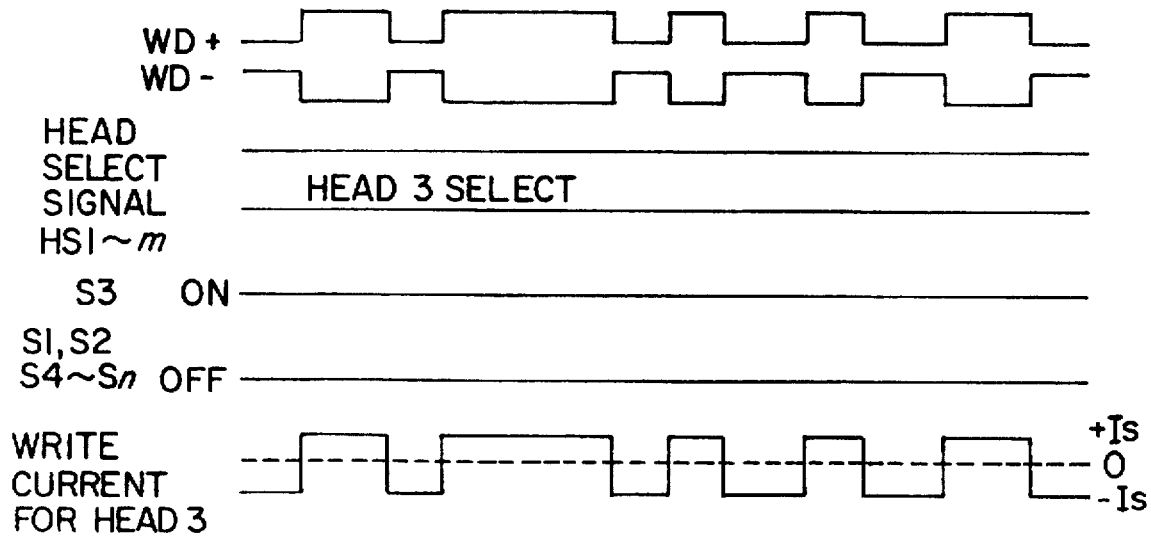

A write circuit will now be explained. FIG. 8 is a control block diagram for the magnetic disk apparatus; FIG. 9 is a block diagram showing the write circuit in FIG. 8; FIG. 10 is a circuit diagram for the write circuit in FIG. 9; and FIGS. 11A and 11B are explanatory diagrams for the write processing.

In FIG. 8, an encoder 40 compresses and encodes write data that is sent from a controller (not shown) of the magnetic disk apparatus. In response to the coded write data, a write circuit 41 drives, at a write current value, one of the magnetic heads, 23-1 to 23-9 and 23-11 to 23-20, that is designated by a head select signal from the controller. A read circuit 42 selects and outputs a read signal from one of the magnetic heads, 23-1 to 23-9 and 23-11 to 23-20, that is designated by the select signal from the controller. A decoder 43 decompresses and decodes a read signal and outputs the obtained read data to the controller.

A servo circuit 44 demodulates a servo signal that the servo head 23-10 has read on the servo surfaces prepares from a demodulation signal a real speed signal and a track crossing signals and outputs the demodulation signal, the real speed signal and the track crossing signal. A carriage driver 45 receives a cylinder select signal (target cylinder position) from the controllers calculates the distance to a current cylinder position, and prepares a command speed signal. In consonance with a difference between the command speed signal and the real speed signal that is sent from the servo circuit 44, the carriage driver 45 energizes the coil 29 of the actuator 22 to control the speed. Also, in response to a track crossing signal from the servo circuit 44, the carriage driver 45 updates a current cylinder position. Then, when it is detected that the updated current cylinder position is in the vicinity of the target cylinder, the coil 29 of the actuator 22 is energized in consonance with a demodulation signal from the servo circuit 44 and a magnetic head is positioned over the target cylinder.

The write circuit 41, the read circuit 42 and the demodulator of the servo circuit 44 are mounted on the IC mounting board 31 depicted in FIG. 2. The other circuits are mounted on an externally attached print board, which is connected to the IC mounting board 31 by a ribbon cable.

In the block diagram of the write circuit in FIG. 9, a buffer amplifier 50 amplifies write data, WD+ and WD-, from the encoder 40. Write amplifiers 51-1 through 51-n are connected to a write current source 53, which will be described later, and one of them is selected by a head select signal from a head selector 52, which will also be described later. The selected write amplifier 51-1 to 51-n converts write data from the buffer amplifier 50 to a write current whose value is specified by the write current source 53, and applies the converted current to the corresponding data head 1-n (in FIG. 8, data head 23-1 to 23-9, or 23-11 to 23-20).

The head selector 52 decodes m-bit head select signals HS1 to HSm from the controller, and produces head select signals S1 to Sn by the corresponding number of data heads, n. The write current source 53 generates a write current to drive the write amplifiers 51-1 through 51-n.

Write current setting resistors R1 and R2 are connected to a switch 54. The switch 54 is closed upon receipt of the select signal S3 for designating the data head 3 (the data head 23-9 that is collaterally paired with the servo head 23-10 in FIGS. 6 and 8). The write current setting resistors R1 and R2 are connected in parallel to the write current source 53 to decrease the value of the write current from the write current source 53. When the select signal S3 is not high (i.e., a data head other than the data head 23-9 is selected), the switch 54 is not closed. Then, since only the write current setting resistor R1 is connected to the write current source 53, the value for the write current from the write current source 53 increases.

In the circuit diagram for the write circuit in FIG. 10, the buffer amplifier 50 includes a series circuit comprising a resistor R10, a transistor Q1 and a resistor R12, and a series circuit comprising a resistor R11, a transistor Q2 and a resistor R13. The write data WD+ is input to the base of the transistor Q1 while the write data WD− is input to the base of the transistor Q2. These data are then output from the collectors of the respective transistors Q1 and Q2.

In each of the write amplifiers 51-1 through 51-n, located between a power supply +V and the write current source 53 is a coil driving circuit where transistors Q8, Q9, Q12 and Q13 are arranged in an H shape with a magnetic head coil in the center. To drive the transistors Q9 and Q13, each of the write amplifier 51-1 to 51-n includes, between the power supply +V and the ground of the apparatus, a series circuit comprising a transistor Q6, resistors R21 and R22 and a transistor Q7, and a series circuit comprising a transistor Q10, resistors R23 and R24, and a transistor Q11.

Between the power supply +V and the apparatus ground, the write amplifiers 51-1 to 51-n each include a driver that has a series circuit comprising a resistor R19, a transistor Q3 and a resistor R17 and a series circuit comprising a resistor R20, a transistor Q4 and a resistor R18. The outputs of the transistors Q1 and Q2 of the buffer amplifier 50 are sent to the bases of the transistors Q3 and Q4, respectively, and the outputs from the collectors of the transistors Q3 and Q4 are sent to the bases of the transistors Q7 and Q8, and Q11 and Q12.

Further, to activate the driver when a head select signal Sm is received, between the power supply +V and the apparatus ground, the write amplifiers 51-1 to 51-n each have a series circuit comprising a transistor Q5, to whose base the head select signal is sent, and a resistor R16, and resistors R14 and R15, which connect the emitter of the transistor Q5 to the bases of the transistors Q3 and Q4 of the driver.

In the write current source 53, a series circuit comprising a transistor Q15 and a resistor R26 and a series circuit comprising resistors R25, R28 and R1 are connected in parallel between the power supply +V and the apparatus ground. The write current source 53 also has an output circuit, which includes a transistor Q14, to whose base the emitter output of the transistor Q15 is sent, and a resistor R27. An emitter that is common to the transistors Q8 and Q12, of the H-shaped coil driver in each of the write amplifiers 51-1 to 51-n, is connected to the collector of the transistor Q14.

A series circuit comprising a transistor Q16, which constitutes the switch 54, and the write current setting resistor R2 is connected in parallel to the write current setting resistor R1 of the write current source 53. The head select signal S3 is thus input to the base of the transistor Q16.

By employing as data head 3 the data head 23-9 that is collaterally paired with the servo head 23-10 in FIGS. 4, 6 and 8, processing of the arrangement shown in FIGS. 9 and 10 will now be explained while referring to FIGS. 11A and 11B.

Write data that is supplied from the controller via the encoder 40 consists of positive write data WD+ and its inverted write data WD−, as shown in FIGS. 11A and 11B. These write data are sent to the bases of the transistors Q1 and Q2 in the buffer amplifier 50, respectively. When the write data WD+ and WD− are high, the transistors Q1 and Q2 are rendered active and send their emitter outputs to the write amplifiers 51-1 to 51-n.

The head select signals HS1 to HSm from the controller are decoded by the head selector 52, and only a corresponding head select signal S1 to Sn is set high and output to the transistor Q5 of the identical write amplifier 51-1 to 51-n.

In response to the high head select signal S1 to Sn, the write amplifier 51-1 to 51-n renders the transistor Q5 active. A current is then fed via the transistor Q5 to the resistors R14 and R15, and the transistors Q3 and Q4 become active. As a result, the transistors Q3 and Q4 can be driven by the emitter outputs of the transistors Q1 and Q2 of the buffer amplifier 50, and in consonance with write data WD+ or WD−, the H-shaped driving circuit is activated.

More specifically, when the transistor Q1 of the buffer amplifier 50 is rendered on in consonance with write data WD+, the transistor Q3 is also rendered on and activates the transistors Q7 and Q8 of the H-shaped driving circuit. In a state of equilibrium, the transistors Q6 and Q10 of the H-shaped driving circuit are cut off and the transistors Q9 and Q13 are rendered active. When the transistor Q7 is rendered on, therefore, the transistor Q6 is also rendered active to cut off the transistor Q9. Since the transistors Q13 and Q8 are active and a write current flows from the power supply +V via the transistors Q13, the magnetic head coil and the transistor Q8 to the write current source 53, the magnetic head coil is energized.

The head select signal S3, which designates the magnetic head 23-9 (head 3 in FIG. 9) that is collaterally paired with the servo head 23-10, is sent to the switch 54. When the head select signal S3 that designates the head 3 is not high (a head other than head 3 is selected), the transistor Q16 of the switch 54 is cut off, and only the write current setting resistor R1 is connected to the writ current source 53. The limit current value of the write current source 53 is Ix (30 mA in this case), as shown in FIG. 11A.

When the head 3 is selected and the head select signal S3 is high, the transistor Q16 for the switch 54 is rendered active. Both resistors R1 and R2 are therefore employed as parallel write current setting resistors, and the write current setting resistance is smaller than it is when only the current setting resistor R1 is employed. The base voltage of the transistor Q15 and the current flowing through the transistor Q15 are reduced. Accordingly, the base potential of the transistor Q14 falls and the current value of the transistor Q14 is decreased to Is (15 mA in this case), as shown in FIG. 11B.

When the magnetic head 23-9 (the head 3 in FIG. 9) is selected, the write current value is small, Is, and when a head other than the magnetic head 23-9 (head 3) is selected, the write current value is large, Ix.

In the same manner as is described above, when the transistor Q2 of the buffer amplifier 50 is rendered on, the transistor Q4 is also rendered on, and thereafter the transistors Q11 and Q12 of the H-shaped driving circuit are rendered on. In a state of equilibrium, the transistors Q6 and Q10 of the H-shaped driving circuit are cut off and the transistors Q9 and Q13 are rendered on. With the transistor Q11 active, therefore, the transistor Q10 is rendered active so as to cut off the transistor Q13. As the transistors Q9 and Q12 are rendered active and write current flows from the power supply +V via the transistor Q9, the magnetic head coil and the transistor Q12 to the write current source 53, the magnetic head coil is energized.

When the head 3 is selected at this time, the write current value is small, −Is, as shown in FIG. 11B. When a head other than the head 3 is selected, the write current value is large, −Ix, as shown in FIG. 11A.

In the write amplifier 51 that has received a low head select signal S1 to Sn, since the transistor Q5 is not rendered on, the transistors Q3 and Q4 are not active. Even if they receive the respective emitter outputs of the transistors Q1 and Q2 of the buffer amplifier 50, therefore, the transistors Q3 and Q4 will not be activated.

As described above, since a write current value is small only for the data head 23-9 that is collaterally paired with the servo head 23-10, and since a write current value is large for the other data heads, 23-1 through 23-8 and 23-11 through 23-10, noise leakage from the data head 23-9 is reduced and its influence on a read servo signal of the servo head 23-10 is minimized.

A magnetic head with a preferable electromagnetic transfer characteristic may be employed as the magnetic head 23-9, so that desirable data writing is possible even at a smaller write current value.

Besides the above described embodiment, the present invention can be modified as follows. First, a floating magnetic head has been employed, but the present invention can also use a contact type magnetic head. Second, although a magnetic head with a preferable electromagnetic transfer characteristic is employed as a data head that is collaterally paired with a servo head, a magnetic disk with a preferable electromagnetic transfer characteristic may be employed as a magnetic disk for such a data head, to obtain the same effect. Third, although the number of magnetic disks provided for the magnetic disk apparatus in this embodiment is eleven, the number of the magnetic disks is not limited to eleven.

As described above, according to the present invention, even though the spacing between a servo head and a data head that are collaterally paired is reduced, since a write current value for that data head is small, the influence of the electromagnetic noise produced by that data head on the servo head can be reduced. The reduction of influence can be performed simply by merely setting a small write current value.

What is claimed is:

1. A method for writing data, for a magnetic disk apparatus that includes a plurality of magnetic disks that are stacked at predetermined intervals; a servo head for reading servo signals recorded on a servo surface of one of said magnetic disks; a plurality of data heads, one of which is provided for each data surface of said magnetic disks, with a first data head being collaterally positioned with said servo head with no intervening magnetic disk therebetween, and said second data heads being positioned at other than said collateral position; and an actuator for supporting said servo head and said data heads and for positioning said servo head and said data heads by moving them radially relative to said magnetic disks, comprising the steps of:

producing a write current whose value is varied by selecting either said first data head or one of said second data heads in consonance with a head select signal and wherein the write current produced when said first data head is selected is less than a value of a write current that is produced when one of said second data heads is selected; and driving, at said write current value, said data head that is selected by said head select signal in consonance with write data.

2. A method for writing data in a magnetic disk apparatus according to claim 1, wherein is employed, as said first data head, a magnetic head that, even when a write current value is relatively small, maintains an electromagnetic transfer characteristic equivalent to that of said second data heads, to which are applied a greater write current value.

3. A method for writing data in a magnetic disk apparatus according to claim 1, wherein employed with said first data head is a magnetic disk that, even upon application of a relatively weak write current to said first data head, the head and disk combination has an electromagnetic transfer characteristic equivalent to that of said second data heads and disk combination, to which are applied a greater write current value.

4. A method for writing data in a magnetic disk apparatus according to claim 2, wherein employed with said first data head is a magnetic disk that, even upon application of relatively weak write current to said first data head, has an electromagnetic transfer characteristic equivalent to that of said second data heads, which are applied a greater write current value.

5. A magnetic disk apparatus comprising:

a plurality of magnetic disks that are stacked at predetermined intervals;

a servo head for reading servo signals recorded on a servo surface of one of said magnetic disks;

a plurality of data heads, one of which is provided for each data recording surface of said magnetic disks, with a first data head being collaterally positioned with said servo head with no intervening magnetic disk therebetween, and second data heads being positioned at other than said collateral position;

an actuator for supporting said servo head and said data heads and for positioning said servo head and said data heads by moving them radially relative to said magnetic disks; and a write circuit for varying a write current value by selecting either said first data head or one of said second data heads in consonance with a head select signal, for driving said selected data head in consonance with write data and for setting the write current produced when said first data head is selected smaller than a value of a write current that is produced when one of said second data heads is selected.

6. A magnetic disk apparatus according to claim 5, wherein said write circuit includes:

a plurality of write amplifiers, provided respectively for said plurality of data heads, for driving a corresponding data head in consonance with received write data;

a write current generator for applying a relatively weak write current to said write amplifiers when said head select signal designates said first data head, and for applying a stronger write current to said write amplifiers when said head select signal designates one of said second data heads; and a head selector for selecting one of said write amplifiers in consonance with said head select signal.

7. A magnetic disk apparatus according to claim 6, wherein said first data head is a magnetic head that, even at a relatively small write current value, maintains an electromagnetic transfer characteristic equivalent to that of said second data heads, to which are applied a greater write current value.

8. A magnetic disk apparatus according to claim 7, wherein a magnetic disk positioned proximate to said first data head is a magnetic disk that, even upon application of a relatively weak write current to said first data head, has an electromagnetic transfer characteristic equivalent to that of a magnetic disk that is proximate to said second data heads, to which are applied a greater write current value.

9. A magnetic disk apparatus according to claim 5, wherein said first data head is a magnetic head that, even at a relatively small write current value, maintains an electromagnetic transfer characteristic equivalent to that of said second data heads, to which are applied a greater write current value.

10. A magnetic disk apparatus according to claim 5, wherein a magnetic disk positioned proximate to said first data head is a magnetic disk that, even upon application of a relatively weak write current to said first data head, has an electromagnetic transfer characteristic equivalent to that of a magnetic disk that is proximate to said second data heads, to which are applied a greater write current value.

11. A magnetic disk apparatus according to claim 6, wherein a magnetic disk positioned proximate to said first data head is a magnetic disk that, even upon application of a relatively weak write current to said first data head, has an electromagnetic transfer characteristic equivalent to that of a magnetic disk that is proximate to said second data heads, to which are applied a greater write current value.

* * * * *